(12) United States Patent
Lee et al.

(10) Patent No.: US 7,362,693 B2
(45) Date of Patent: *Apr. 22, 2008

(54) NEAR-FIELD OPTICAL STORAGE MEDIUM AND OPTICAL DATA STORAGE SYSTEM THEREFOR

(75) Inventors: Chul-Woo Lee, Sungnam (KR); Kun-Ho Cho, Suwon (KR); Dong-Ho Shin, Seoul (KR); Joong-Eon Seo, Uiwang (KR); Seung-Tae Jung, Sungnam (KR); Byeong-Ho Park, Suwon (KR); In-Oh Hwang, Sungnam (KR); Myong-Do Ro, Suwon (KR); Yoon-Gi Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

This patent is subject to a terminal disclaimer.

(21) Appl. No.: 11/409,028

(22) Filed: Apr. 24, 2006

(65) Prior Publication Data

US 2006/0198278 A1 Sep. 7, 2006

Related U.S. Application Data

(60) Continuation of application No. 10/843,294, filed on May 12, 2004, now Pat. No. 7,054,259, which is a continuation of application No. 10/151,908, filed on May 22, 2002, now Pat. No. 6,798,732, which is a division of application No. 09/301,607, filed on Apr. 29, 1999, now Pat. No. 6,621,787.

(60) Provisional application No. 60/100,778, filed on Sep. 18, 1998.

(30) Foreign Application Priority Data

Sep. 18, 1998 (KR) .................................. 98-38738
Feb. 12, 1999 (KR) .................................. 99-5043

(51) Int. Cl.
 G11B 7/24 (2006.01)
(52) U.S. Cl. .............................. 369/275.1; 369/112.24; 369/13.28
(58) Field of Classification Search .. 369/275.1–275.5, 369/13.28, 13.33, 112.24, 283, 286, 112.23, 369/13.53, 13.02, 288
 See application file for complete search history.

(56) References Cited

U.S. PATENT DOCUMENTS 5,121,256 A 6/1992 Corle et al.

(Continued)

FOREIGN PATENT DOCUMENTS

EP 0 444 850 9/1991

(Continued)

*Primary Examiner*—Ali Neyzari
(74) *Attorney, Agent, or Firm*—Stein, McEwen & Bui, LLP

(57) ABSTRACT

An optical data storage system writes or reads information with respect to an optical storage medium using an optical pickup including a solid immersion optical system or a solid immersion lens for generating a near-field and emitting a light beam. The optical storage medium includes a recording layer which is formed on a surface of an optical transmissive layer opposite to another surface of the optical transmissive layer which opposes the solid immersion optical system or solid immersion lens. The thickness of the optical transmissive layer is larger than one wavelength of the light beam. The interval between the surfaces of the solid immersion lens or solid immersion optical system and the optical transmissive layer is smaller than one wavelength of the light beam. Thus, the light beam reflected from the inside of an air gap and the inside of the optical storage medium between the air gap and the recording layer does not function as noise with respect to the light reflected from the recording layer. Also, since the thickness of a protective layer or a substrate which is an external surface of the optical storage medium can be thickened, information can be written or read with respect to the optical storage medium even when the optical storage medium has dust and/or damage.

16 Claims, 6 Drawing Sheets

U.S. PATENT DOCUMENTS

| | | |
|---|---|---|
| 5,125,750 A | 6/1992 | Corle et al. |
| 5,202,880 A | 4/1993 | Lee et al. |
| 5,237,548 A | 8/1993 | Muchnik |
| 5,274,623 A | 12/1993 | Usami et al. |
| 5,470,627 A | 11/1995 | Lee et al. |
| 5,572,491 A | 11/1996 | Karibe et al. |
| 5,596,566 A | 1/1997 | Taki |
| 5,617,378 A | 4/1997 | Watanabe et al. |
| 5,729,393 A | 3/1998 | Lee et al. |
| 5,764,613 A | 6/1998 | Yamamoto et al. |
| 5,805,563 A | 9/1998 | Nakano |
| 5,808,973 A | 9/1998 | Tanaka |
| 5,963,532 A | 10/1999 | Hajjar |
| 6,063,468 A | 5/2000 | Aratani et al. |
| 6,104,675 A | 8/2000 | Hatam-Tabrizi |
| 6,104,687 A | 8/2000 | Lee et al. |
| 6,127,017 A | 10/2000 | Hirata et al. |
| 6,130,779 A | 10/2000 | Carlson et al. |
| 6,246,656 B1 | 6/2001 | Kawakubo et al. |
| 6,266,315 B1 | 7/2001 | Lee et al. |
| 6,621,787 B1 | 9/2003 | Lee et al. |
| 6,798,732 B2 | 9/2004 | Lee et al. |
| 6,885,625 B2 | 4/2005 | Lee et al. |
| 7,054,259 B2 * | 5/2006 | Lee et al. ............ 369/275.1 |
| 2006/0198278 A1 * | 9/2006 | Lee et al. ............ 369/112.23 |

FOREIGN PATENT DOCUMENTS

| | | |
|---|---|---|
| EP | 0 613 127 | 8/1994 |
| EP | 0 908 874 | 4/1999 |
| WO | WO 98/09278 | 3/1998 |

* cited by examiner

NEAR-FIELD OPTICAL STORAGE MEDIUM AND OPTICAL DATA STORAGE SYSTEM THEREFOR

CROSS-REFERENCE TO RELATED APPLICATIONS

This application is a continuation of U.S. application Ser. No. 10/843,294, filed May 12, 2004, now U.S. Pat. No. 7,054,259, which is a continuation of U.S. application Ser. No. 10/151,908 filed May 22, 2002, now U.S. Pat. No. 6,798,732, which is a divisional application of U.S. application Ser. No. 09/301,607 filed Apr. 29, 1999, now U.S. Pat. No. 6,621,787, which claims the benefit of Korean Application Nos. 98-38738, filed Sep. 18, 1998 and 99-5043, filed Feb. 12, 1999, in the Korean Patent Office and U.S. Provisional Patent Application No. 60/100,778, filed Sep. 18, 1998, the disclosures of which are incorporated herein by reference.

BACKGROUND OF THE INVENTION

1. Field of the Invention

The present invention relates to a near-field optical storage medium and an optical data storage system having a focusing optical system, and more particularly, to an optical storage medium which is used together with an optical pickup having a near-field focusing optical system such as a solid immersion optical system or a solid immersion lens, and a near-field optical data storage system for performing writing and/or reading of information with respect to the optical storage medium.

2. Description of the Related Art

In an optical data storage system, an optical pickup having a solid immersion optical system or solid immersion lens performs writing and/or reading of information with respect to the optical data storage medium, using a near-field formed between the solid immersion optical system or solid immersion lens and the optical data storage medium.

FIGS. 1 and 2 show an existing optical disc used as an optical data storage medium, in which FIG. 1 shows that an existing optical disc is used together with the optical data storage system having a catadioptric solid immersion optical system, and FIG. 2 shows that an existing optical disc is used together with an optical data storage system having a refractive type solid immersion lens.

In FIG. 1, a light beam 1 emitted from a light transmission and reception portion 10 is reflected by a reflective mirror 12 and incident to a catadioptric solid immersion optical system 14. A slider 16 supporting the solid immersion optical system 14 aerodynamically raises the solid immersion optical system 14 aerodynamically through an air bearing generated by a relative movement between an optical storage medium 18 such as an optical disc and the slider 16. As a result, an air gap is formed between the solid immersion optical system 14 and a protective layer 183 of the optical storage medium 18. An interval of the air gap, that is, a distance between the opposing surfaces of the solid immersion optical system 14 and the optical storage medium 18, is maintained for example within one wavelength of light used. It is preferable that it is maintained much smaller than one wavelength of the used light. The catadioptric solid immersion optical system 14 refracts and reflects the light beam 1 incident from the reflective mirror 12, and forms a beam spot focused on its surface opposing the optical storage medium 18. The beam spot forms a near field in the air gap between the solid immersion optical system 14 and the surface of the optical storage medium 18.

The optical data storage system shown in FIG. 2 includes a focusing objective lens 24 and a refractive solid immersion lens 26, instead of the catadioptric solid immersion optical system 14 shown in FIG. 1. A light transmission and reception portion 20 emits a light beam 1 having an optimized diameter for the objective lens 24. A reflective mirror 22 reflects the light beam 1 emitted from the light transmission and reception portion 20 toward the objective lens 24. The objective lens 24 focuses the light beam 1 incident from the reflective mirror 22 on the solid immersion lens 26. The beam spot focused on the solid immersion lens 26 forms a near field between a surface of the solid immersion lens 26 opposing the optical storage medium 18 and a protective layer 183 in the optical storage medium 18. The objective lens 24 and the solid immersion lens 26 are supported by a slider 28. Like the slider 16 shown in FIG. 1, the slider 28 aerodynamically raises the solid immersion lens 26 and forms an air gap having an interval within one wavelength of light used between the solid immersion lens 26 and the optical storage medium 18.

In the optical data storage system shown in FIG. 1 or 2, a beam spot is formed in a near field generating portion being a predetermined position on the surface of the solid immersion optical system 14 or the solid immersion lens 26 which opposes the optical storage medium 18. In general, the system shown in FIG. 1 or 2 uses a fine beam spot corresponding to a numerical aperture (NA) of at least one for writing or reading information with respect to the optical storage medium 18. In the case that the used light has a wavelength A of 650 nm, a light beam which forms a beam spot on the near field generating portion passes an air gap of an interval of approximately 110 nm and a protective layer 183 of 70-90 nm thick, and is transferred to a recording layer of the optical storage medium 18. The recording layer is disposed between the protective layer 183 and a substrate 181 of the optical storage medium 18. The light beam reflected from the recording layer transmits through the protective layer 183 and the air gap and is transferred to the solid immersion optical system 14 or the solid immersion lens 26.

Generally, according to the refraction and total reflection laws, the light contributed to a large numerical aperture is totally reflected from the emergence surface of the solid immersion optical system 14 or the solid immersion lens 26, that is, the near field generating portion being an optical transmitting surface adjacent to the optical storage medium 18. Therefore, in the case that the interval of the air gap is larger than the wavelength A of the used light, the optical storage medium 18 is positioned in the portion beyond the near field. Thus, the light contributed to the large numerical aperture does not contribute to formation of the beam spot on the optical storage medium 18. In other words, the numerical aperture of the light beam contributed to the formation of the beam spot on the optical storage medium 18 becomes smaller than "1", while passing through the air gap. As a result, a spot size of the light beam focused on the optical storage medium 18 with the light traveling through the air gap having an interval larger than the wavelength of the used light, becomes larger than a size of the beam spot formed on the near field generating portion of the solid immersion optical system 14 or the solid immersion lens 26. However, in the case that an interval of the air gap is sufficiently smaller than one wavelength of the used light, preferably λ/4, the spot size of the light beam incident to the optical storage medium 18 is close to the size of the beam spot formed in the near field generating portion. Therefore, under this condition, the optical data storage system shown in FIG. 1 or 2 can write or read information at high density with respect to the recording layer of the optical storage medium 18, using the solid immersion optical system 14 or the solid immersion lens 26.

FIG. 3 shows the near field generating portion between the surface of the solid immersion optical system 14 or the solid immersion lens 26 and the protective layer 183 of the optical storage medium 18. The interval SRD from the surface of the solid immersion optical system 14 or the solid immersion lens 26 opposing the optical storage medium 18 to the protective layer 183, more accurately, to the recording layer, becomes smaller than one wavelength of the used light, and the recording layer in the optical storage medium 18 is positioned within the distance providing a near field effect.

An example of an existing optical disc is disclosed in U.S. Pat. No. 5,470,627. In the case that the above existing optical disc is for example, a magneto optical disc, the disc includes a reflective layer, a first dielectric layer, a recording layer, and a second dielectric layer which are disposed on a conventional substrate in sequence. The reflective layer is made of metal such as an aluminum alloy having a 500-1000 Å thickness. The first dielectric layer is made of aluminum nitride or silicon nitride having a 150-400 Å thickness. The recording layer is made of rare-earth transition-metal alloy such as TbFeCo having a 150-500 Å thickness. Finally, the protective layer is made of silicon nitride $Si_3N_4$ having a 400-800 Å thickness.

However, in the case that the above-described existing optical disc is used, the optical data storage system has two problems as follows. These problems take place identically in both the data storage system including the solid immersion optical system 14 and the data storage system including the solid immersion lens 26. Therefore, for convenience of explanation, these problems will be described in connection with the existing optical disc and the solid immersion lens 26.

First, the problem that the light beam reflected from the recording layer of the existing optical disc having the above structure contains noise due to interference will be described with reference to FIGS. 4 and 5. FIG. 4 shows the solid immersion lens 26 having a refractive index of 1.8. In FIG. 4, "air gap reflective light (NB)" illustrates the light beam totally reflected from the near field generating portion of the solid immersion lens 26 and the air gap between the solid immersion lens 26 and the optical storage medium 18, and "recording layer reflective light (RB)" illustrates the light beam reflected from the recording layer in the optical storage medium 18. In the case that the solid immersion lens 26 has a refractive index of 1.8, the total reflective angle of 56.3 degree at the solid immersion lens 26 corresponds to the numerical aperture of 0.83. FIG. 5 shows angle-reflectance characteristics of the solid immersion optical system 14 or the solid immersion lens 26 with respect to three air gap intervals. In FIG. 5, curves (a) show angle-reflectance characteristics with respect to the air gap interval of 50 nm, curves (b) show angle-reflectance characteristics with respect to the air gap interval of 100 nm, and curves (c) show angle-reflectance characteristics with respect to the air gap interval of 150 nm. Among the curves (a) through (c), the curves denoted as "++" show angle-reflectance characteristics with respect to the p-polarized light beam, and the curves denoted as solid lines show angle-reflectance characteristics with respect to the s-polarized light beam. The angle denoted at the horizontal axis indicates an incident angle possessed by the light beam proceeding to the air gap from the solid immersion lens 26. For example, in the case that an interval of the air gap existing between the optical storage medium 18 and the solid immersion lens 26 becomes larger than the wavelength of the used light, the portion of the light beam having an angle larger than the total reflection angle of 56.3 degree, particularly the portion of the light beam contributed to a higher numerical aperture, for example, the numerical aperture of 1.2 or more among the light beam proceeding from the solid immersion lens 26 to the optical storage medium 18, does not transmit through the air gap, but is totally reflected in the near field generating portion or in the inside of the air gap. As can be seen from FIG. 5 showing a reflectance with respect to the numerical aperture of 1.5, the air gap reflective light NB has a relatively higher reflectance. Also, since the air gap and the recording layer are very close to each other, an interference occurs between the air gap reflective light (NB) and the recording layer reflective light (RB). Finally, the air gap reflective light (NB) functions as noise with respect to the recording layer reflective light (RB).

Now, the problem caused by the optical storage medium 18 which is made at high density will be described with reference to FIG. 6. In the case that the optical storage medium 18 is fabricated into a high density optical storage medium, grooves or pits of 100-150 nm width are formed on a substrate 181 for recording information thereon. A reflective layer and a recording layer on which information is actually recorded are in turn put on the grooves or pits, through a coating process. In addition, a protective layer 183 of 150-200 nm thickness is formed on the recording layer. In FIG. 6, an unevenness structure 185 formed by forming the grooves or pits on the substrate 181 is shown in the form of wedges or wells. Since the depth of the recording layer coated by the protective layer 183 is larger than the width of the grooves or pits, the light beam 1 incident to the optical storage medium 18 from the solid immersion optical system 14 or the solid immersion lens 26 does not reach the grooves or pits, or more accurately, the recording layer, but is reflected in the vicinity of the inner side on the surface of the protective layer 183. As a result, the optical data storage system cannot perform writing and/or reading of information with respect to the high density optical storage medium 18.

SUMMARY OF THE INVENTION

To solve the above problems, it is an object of the present invention to provide an optical storage medium including an optical transmissive layer having a desired thickness between a solid immersion optical system or solid immersion lens and a recording layer formed on the optical storage medium, in such a manner that light reflected from an air gap does not function as noise with respect to light reflected from the recording layer, in order to be used together with an optical pickup having the solid immersion optical system or solid immersion lens for writing or reading information.

It is another object of the present invention to provide an optical data storage system including an optical pickup for recording information on the optical storage medium or reading information therefrom.

Additional objects and advantages of the invention will be set forth in part in the description which follows and, in part, will be obvious from the description, or may be learned by practice of the invention.

To accomplish the above and other objects of the present invention, there is provided an optical storage medium for storing information thereon, which is used together with an optical pickup emitting a light beam to access the information and having a focusing optical system, the optical storage medium comprising: a recording layer; and a protective layer, wherein the distance between an optical surface of the focusing optical system and the recording layer is smaller than the wavelength of light used and the thickness of the protective layer is larger than the wavelength of the used light.

To further accomplish the above and other objects of the present invention, there is also provided an optical storage medium for storing information thereon, which is used together with an optical pickup emitting a light beam to access the information and having a focusing optical system for generating a near field, the optical storage medium comprising: an optical transmissive layer having a thickness larger than one wavelength of the light beam and first and second surfaces opposing each other, such that the first surface opposes the focusing optical system; and a recording layer which is formed on the second surface of the optical transmissive layer.

To still further accomplish the above and other objects of the present invention, there is also provided an optical data storage system for writing and/or reading information with respect to an optical storage medium, the optical data storage system comprising: an optical pickup including a focusing lens generating a near field and emitting a light beam to write and/or read the information; and the optical storage medium including an optical transmissive layer having a thickness larger than one wavelength of the light beam and first and second surfaces opposing each other, such that the first surface opposes the focusing lens, and a recording layer which is formed on the second surface of the optical transmissive layer.

According to the present invention, there is also provided an optical data storage system for writing and/or reading information with respect to an optical storage medium, the optical data storage system comprising: first and second optical pickups respectively including focusing optical systems generating near fields and emitting light beams to write and/or read the information; and the optical storage medium including a single optical storage medium including a first optical transmissive layer having a first surface opposing the first optical pickup, a second optical transmissive layer having a first surface opposing the second optical pickup, and first and second recording layers which are respectively formed on second surfaces of the first and second optical transmissive layers opposite the corresponding first surfaces, wherein the first and second optical transmissive layers each have a thickness larger than one wavelength of the light beams and the distances between the first surfaces of the first and second optical transmissive layers and the respective opposing surfaces of the focusing optical systems are smaller than the one wavelength of the light beams.

BRIEF DESCRIPTION OF THE DRAWINGS

The objects and other advantages of the present invention will become more apparent by describing in detail the structures and operations of the present invention with reference to the accompanying drawings, in which.

DESCRIPTION OF THE PREFERRED EMBODIMENTS

Figure 1:
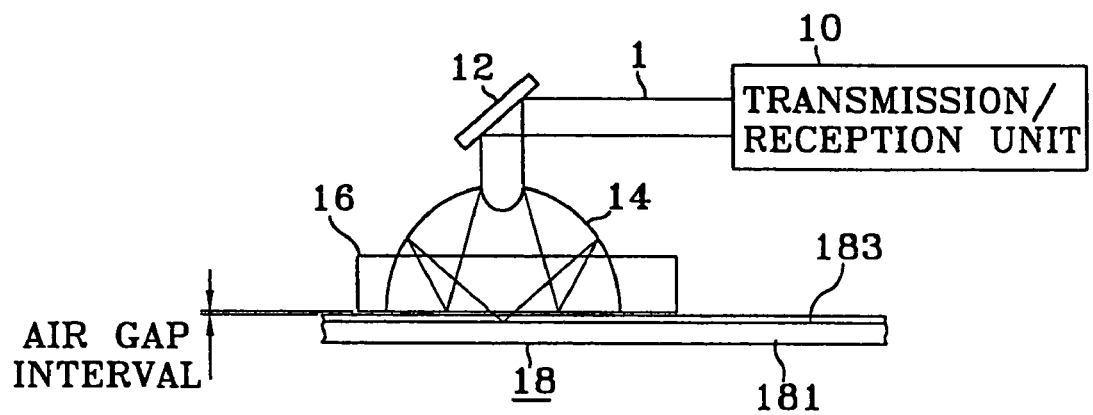
FIG. 1 shows an existing optical data storage system including an existing optical disc and a catadioptric solid immersion lens therefor.
Figure 2:
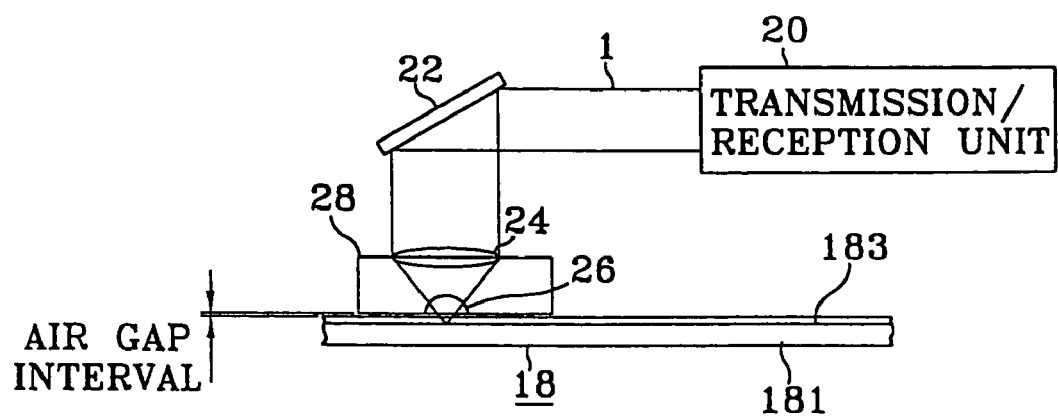
FIG. 2 shows an existing optical data storage system including an existing optical disc and a refractive type solid immersion lens therefor.
Figure 3:
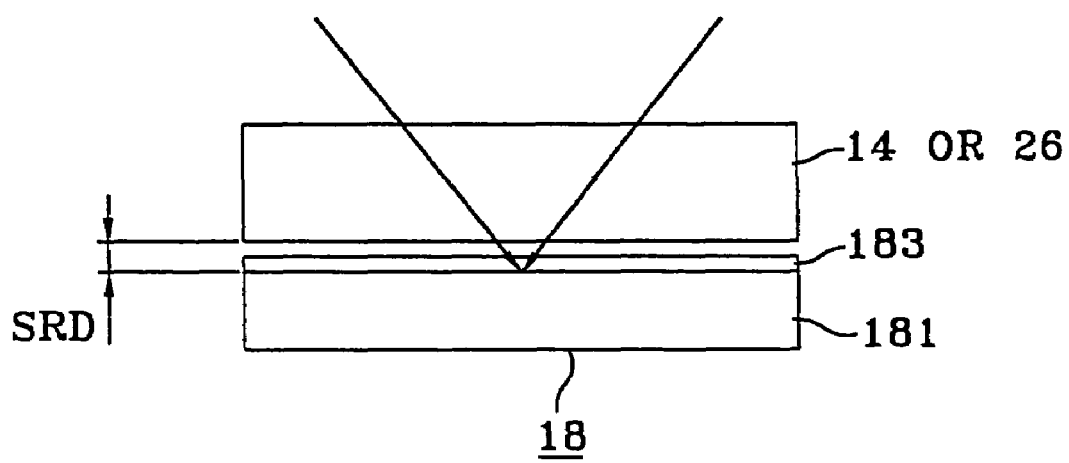
FIG. 3 shows a near field generating portion in the optical data storage system shown in FIG. 1 or 2.
Figure 4:
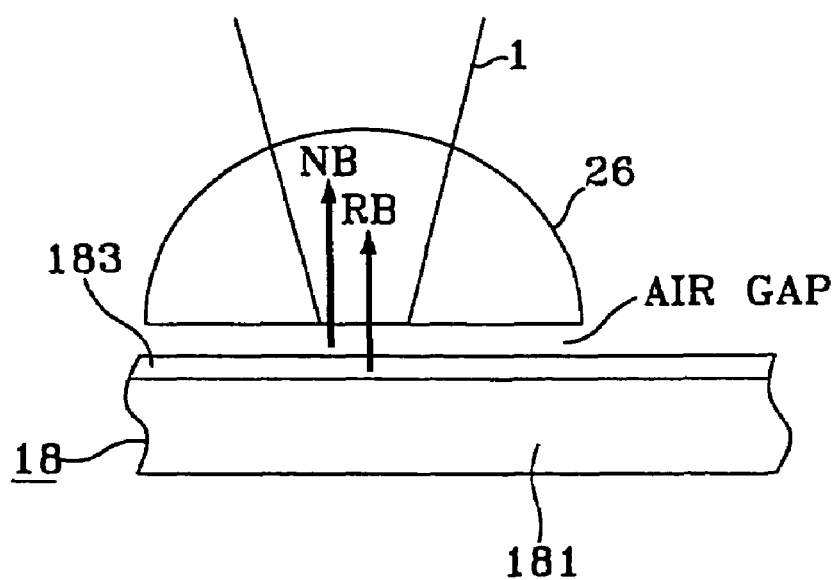
FIG. 4 is a view for explaining air gap reflective light and recording layer reflective light which are generated in the optical data storage system shown in FIG. 2.
Figure 5:
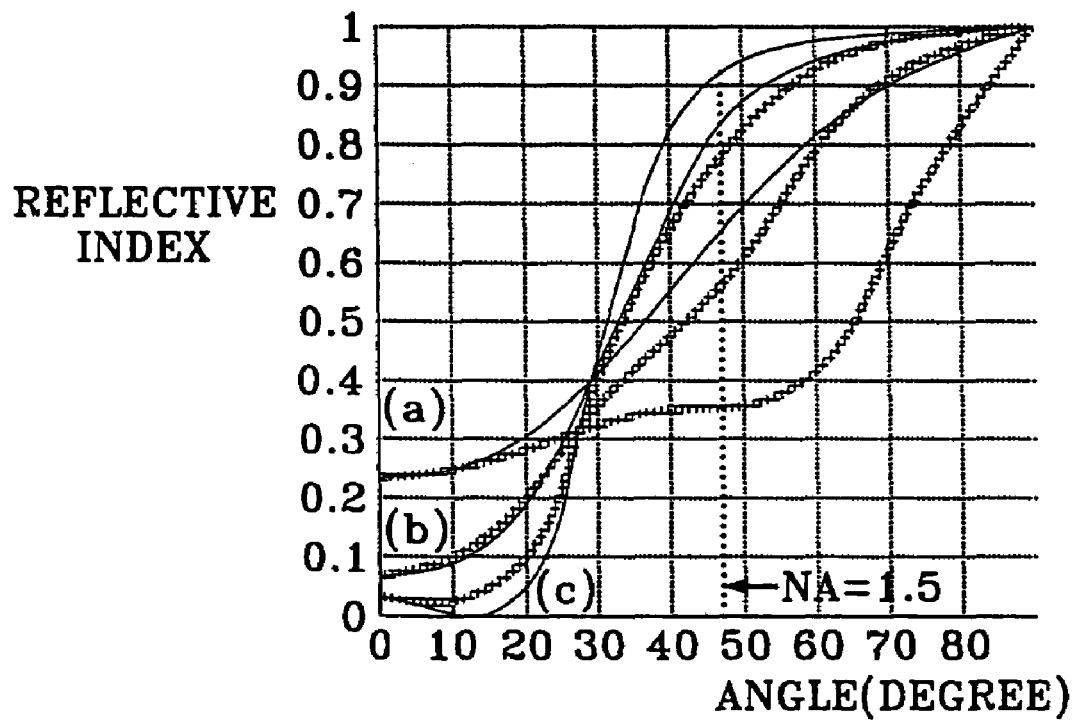
FIG. 5 is a graphical view showing angle-reflectance characteristics according to air gap changes in the optical data storage system shown in FIG. 1 or 2.
Figure 6:
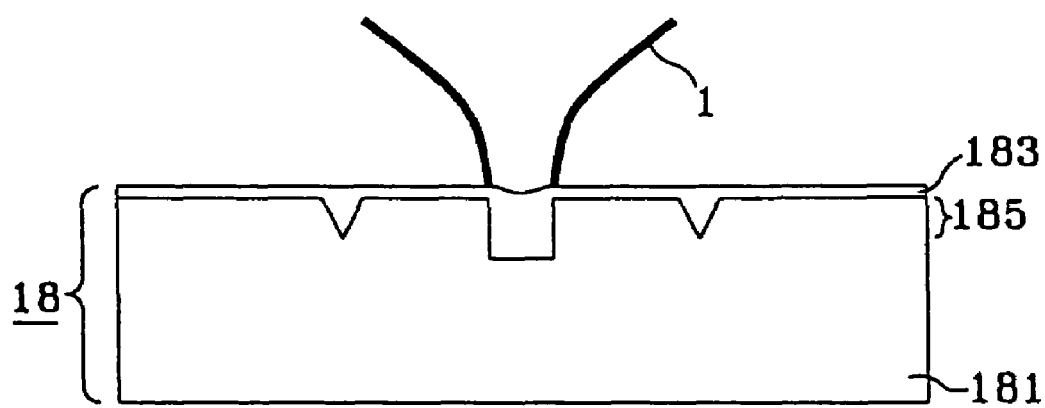
FIG. 6 is a view for explaining the case that an unevenness structure formed on a substrate of an optical storage medium is not detected by an optical pickup in the optical data storage system shown in FIG. 1 or 2.

Preferred embodiments of the present invention will be described with reference to the accompanying drawings, in which elements having the same reference numerals perform the same functions.

Figure 7:
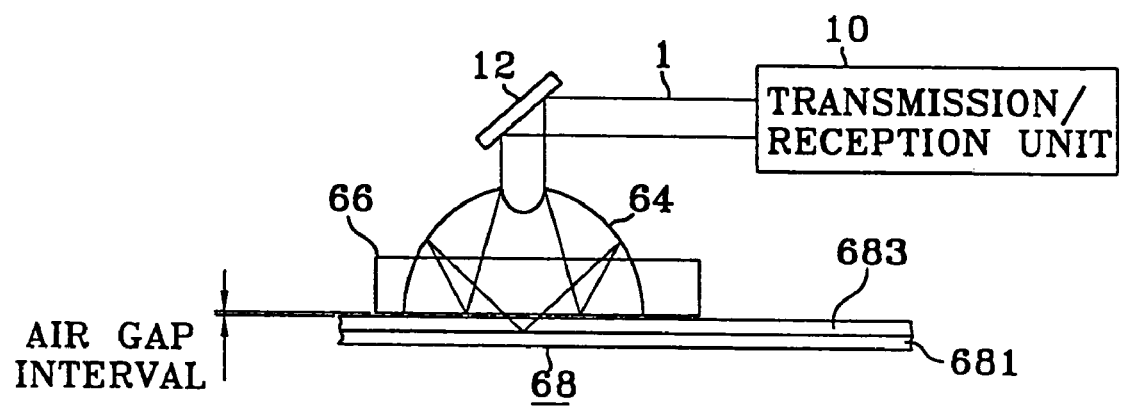
FIG. 7 shows an optical data storage system according to a first embodiment of the present invention, which is used together with an optical data storage system including a catadioptric solid immersion lens.

Referring to FIG. 7, an optical data storage system according to a first embodiment of the present invention includes an optical pickup having a light transmission and reception portion 10, a reflective mirror 12, a catadioptric solid immersion optical system 64, and a slider 66, and an optical storage medium 68. Since some elements shown in FIG. 7 perform the same optical functions as those having the same reference numerals shown in FIG. 1, the detailed description thereof will be omitted.

The optical storage medium 68 includes a substrate 681, an optically transparent protective layer 683, and a recording layer disposed between the substrate 681 and the protective layer 683, and is generally in the form of a disc. In the case of an overwritable optical storage medium 68, the recording layer is formed by coating an optically sensitive material on the surface of the substrate 681. The optical storage medium 68 is fabricated in such a manner that the light beam output from the catadioptric solid immersion optical system 64 transmits through the protective layer 683 having an optical transmissive characteristic and forms a minimized beam spot on the recording layer. Differently from the existing optical storage medium 18 having a thin protective layer 183, the optical storage medium 68 has the protective layer 683 thicker than the wavelength of light used. An air gap exists between the protective layer 683 and the solid immersion optical system 64. Therefore, the surface of the solid immersion optical system 64 positioned toward the reflective mirror 12 has an aspherical surface for forming a minimized beam spot on the recording layer of the optical storage medium 68, taking the thickness and refractive index of the protective layer 683 into consideration.

Alternatively, the catadioptric solid immersion optical system 64 is fabricated in the shape and material similar to those of the solid immersion optical system 14 of FIG. 1. As described above, the shape is slightly changed considering the thickness of the substrate being greater than one wavelength of the used light.

The light beam 1 proceeding from the reflective mirror 12 to the solid immersion lens 64 is refracted and reflected in the solid immersion lens 64 and forms a beam spot in the center of the surface opposing the protective layer 683 of the optical storage medium 68, as shown in FIG. 7. The slider 66 aerodynamically raises the solid immersion lens 64 from the surface of the optical storage medium 68 by the relative movement between the rotating optical storage medium 68 and the slider 66, and forms an air bearing between the opposing surfaces of the optical storage medium 68 and the slider 66. Here, the interval of the air gap existing between the surfaces of the solid immersion lens 64 and the protective layer 683 is maintained at less than the wavelength possessed by the used light, that is the light beam 1 emitted from the light transmission and reception portion 10. In the optimal case, if the air gap interval is maintained at less than ¼ wavelength, an interference phenomenon is reduced to thereby obtain an excellent signal-to-noise ratio.

The light beam 1 incident to the optical storage medium 68 passes through the optically transparent protective layer 683 and reaches the recording layer. Thus, in the case that the optical storage medium 68 substitutes for the high density optical storage medium having grooves or pits of 100-150 nm width and a protective layer 683 of 150-200 nm thickness, the optical storage medium 68 has grooves or pits of 100-150 nm width and a recording layer of 150-500 nm thickness (the depth from the surface of the optical storage medium 68 positioned toward the air gap to the grooves or pits becomes larger than the width of the grooves or pits). Thus, the optical data storage system shown in FIG. 7 can write or read information with respect to the high density optical storage medium.

Figure 8:
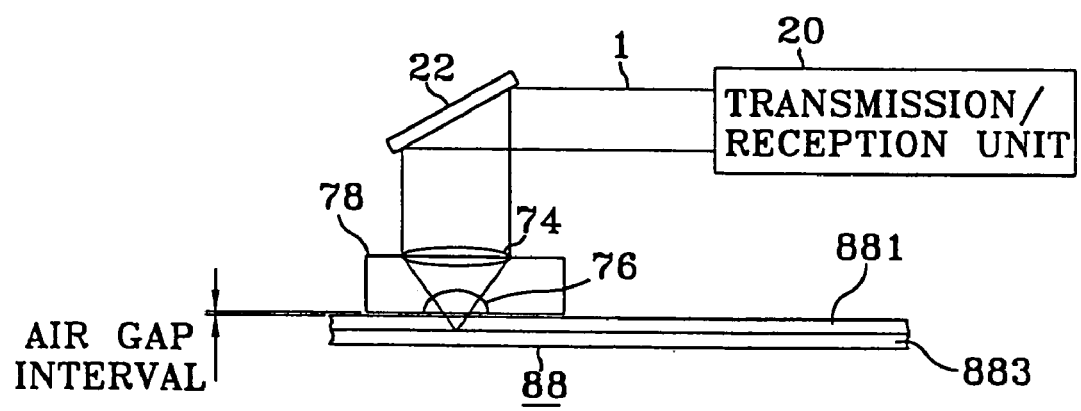
FIG. 8 shows an optical data storage system according to a second embodiment of the present invention, which is used together with an optical data storage system including a transmissive solid immersion lens.
Figure 9:
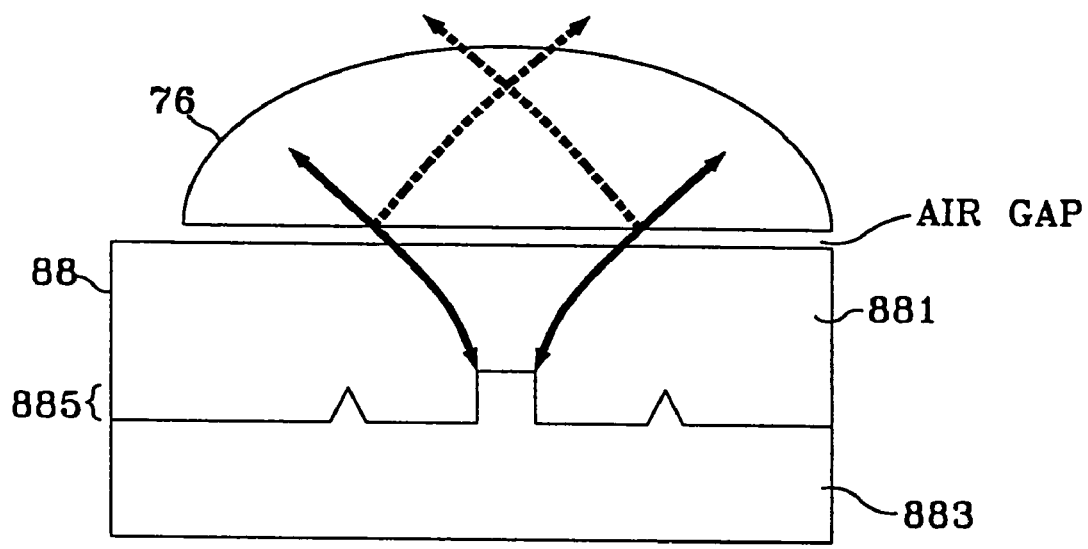
FIG. 9 is a view for explaining the case that an unevenness structure formed on the substrate of the optical disc is detected by an optical pickup in the optical data storage system shown in FIG. 8.

FIG. 8 shows an optical data storage system according to a second embodiment of the present invention. The optical data storage system shown in FIG. 8 includes an objective lens 74, a refractive solid immersion lens 76 and a slider 78, instead of the solid immersion optical system 64 and the slider 66 shown in FIG. 7. FIG. 9 is a enlarged view of an optical storage medium 88 and the solid immersion lens 76 shown in FIG. 8.

The objective lens 74 focuses the light beam 1 incident from a reflective mirror 22 on the refractive solid immersion lens 76. In this embodiment, differently from the above-described optical storage medium 68, the optical storage medium 88 includes a substrate 881 having an optical transmissive characteristic on one surface opposing the solid immersion lens 76, and a protective layer 883 on the other surface facing away from the solid immersion lens 76. Grooves or pits for recording information are formed on the substrate 881 of the optical storage medium 88. An unevenness structure 885 formed by the grooves or pits formed on the optical transmissive substrate 881 is illustrated in the form of wedges or wells concave toward the substrate 881 in FIG. 9.

The solid immersion lens 76 forms an optimized beam spot on the recording layer of the optical storage medium 88, in the center of the surface of the solid immersion lens 76 opposing the optical storage medium 88, using the light beam 1 incident from the objective lens 74. In this case, the objective lens 74 and the solid immersion lens 76 form a beam spot providing a numerical aperture of at least one on the above-described surface of the solid immersion lens 76. The slider 78 raises the solid immersion lens 76 from the surface of the rotating optical storage medium 88 and maintains an interval of the air gap between the surfaces of the solid immersion lens 76 and the substrate 881 as a distance less than ¼ of the wavelength of the light beam 1 emitted from the light transmission and reception portion 20.

In the case that the interval of the air gap is ¼ or more of the wavelength of the used light, the light beam providing the numerical aperture of one or more is totally reflected from the air gap when the light beam forming the beam spot on the surface of the solid immersion lens 76 opposing the optical storage medium 88 passes through the air gap. Thus, only the light beam providing the numerical aperture of less than one is transferred to the optical storage medium 88. The spot size of the light beam reaching the optical storage medium 88 becomes relatively large. However, when the interval of the air gap becomes less than ¼ of the wavelength of the used light, the light beam of the numerical aperture of one or more is transferred to the optical storage medium 88, and the size of the beam spot becomes small. Also, since the unevenness structure 885 in which the recording layer is formed is far from the air gap as compared with the existing optical storage medium, the recording layer reflective light is protected from the interference due to the air gap reflective light. Thus, the optical data storage system shown in FIG. 8 can write or read information with respect to the optical storage medium 88 with an excellent signal-to-noise ratio as well. In FIG. 9, the solid arrow line denotes "recording layer reflective light" reflected from the recording layer of the optical storage medium 88 and the dotted arrow line denotes "air gap reflective light" reflected from the surface of the solid immersion lens 76, the air gap and the substrate 881.

Figure 10:
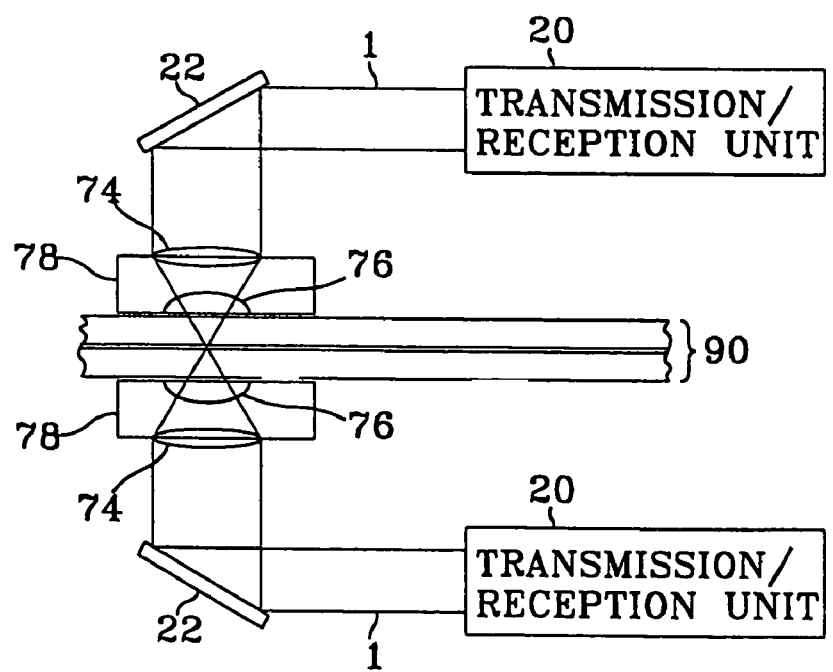
FIG. 10 shows an optical data storage system according to a third embodiment of the present invention.

FIG. 10 shows an optical data storage system according to a third embodiment of the present invention. The system shown in FIG. 10 includes a double-sided optical storage medium 90. The optical storage medium 90 is fabricated in a manner that substrates 681 of two sheets of the optical storage media 68 shown in FIG. 7 are adjacent to each other or contact each other. Otherwise, the storage medium 90 is fabricated in a manner that protective layers 883 of two sheets of the optical storage media 88 shown in FIG. 8 are adjacent to each other or contact each other, or only a protective layer 883 remains after two sheets of the optical storage media have been incorporated into one. The FIG. 10 system includes a pair of the light transmission and reception portions 20, the reflective mirrors 22, the objective lenses 74, the solid immersion lenses 76 and the sliders 78, for the optical storage medium 90. Since the operation of the FIG. 10 system can be appreciated by one skilled in the art well through the above-described embodiments, the detailed description thereof will be omitted.

Since fabrication of the optical data storage system for writing and/or reading information with respect to the optical storage medium 90 shown in FIG. 10 using the system shown in FIG. 7 or 8 is also apparent to those who have an ordinary skill in the art, the detailed description thereof will be omitted.

In the above-described first embodiment, the thickness of the protective layer 683 may become infinitely thick in principle, but it is sufficient that the air gap between the solid immersion optical system 64 and the protective layer 683 is smaller than one wavelength of the used light. However, considering the practical thickness and the numerical aperture determining the size of the light spot, the thickness of the protective layer 683 may be several micrometers to several hundred micrometers. As an example, the thickness of the substrate of a digital versatile disc (DVD) is 0.6 mm, that is, 600 µm. It is apparent to be more practical in accordance with the above thickness.

Also, although the optical axis of the solid immersion optical system 64 or the solid immersion lens 76 is not perpendicular to the surface of the optical storage medium 68 or 88 but is slanted thereto, if the distance between a portion of the surface of the solid immersion optical system 64 or the solid immersion lens 76 farthest from the surface of the optical storage medium 68 or 88 opposing the surface portion of the solid immersion lens 76, and the surface of the optical storage medium 68 or 88 is within the wavelength of the used light, the light beam reflected from the inside of the air gap or the inside of the optical storage medium between the air gap and the recording layer does not function as noise with respect to the light beam reflected from the recording layer. In particular, if the size of the light beam focused by the solid immersion optical system 64 or the solid immersion lens 76 maintains 0.1-0.2 mm at the time of passing through the surface of the optical storage medium 68 or 88, an excellent recording or reproduction characteristic can be obtained with respect to the optical storage medium 68 or 88 having dust or damage on the surface thereof.

Figure 11:
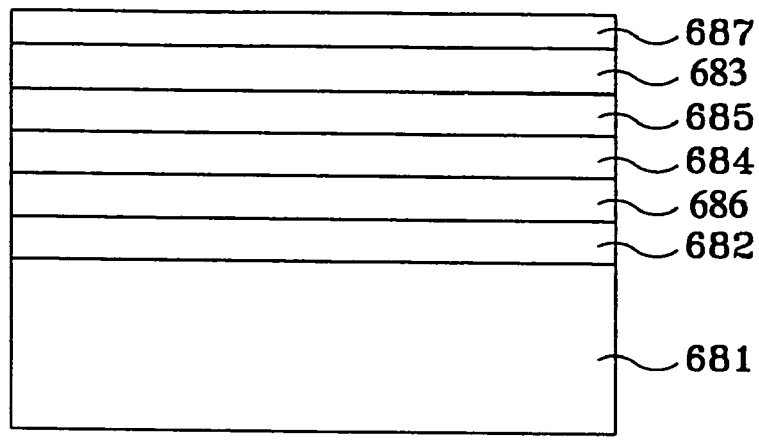
FIG. 11 shows a hierarchical structure of the optical disc according to the first embodiment of the present invention.

FIG. 11 shows a layered structure of the optical disc which embodies the optical storage medium 68 shown in FIG. 7. The optical disc shown in FIG. 11 is a high density magneto optical disc having a recording capacity of 20 GByte or more, which includes a substrate 681, and a reflective layer 682, a first dielectric layer 686, a recording layer 684, a second dielectric layer 685, a protective layer 683 and a lubricant film 687 which are put on the substrate 681 in turn. In fact, the optical storage medium 68 may or may not include the dielectric layer 685. The substrate 681 is made of glass, polycarbonate, PMMA, or an acrylate resin, and has an unevenness structure of a track pitch of 0.3-0.4 µm and a groove depth of 50-800 Å. The reflective layer 682 is made of one of aluminum (Al), nickel (Ni), copper (Cu), platinum (Pt), silver (Ag) and gold (Au), and has a thickness of 500-2000 Å. The first and second dielectric layers 686 and 685 are made of $Si_3N_4$, $ZnS-SiO_2$, etc. The first dielectric layer 686 has a thickness of 100-400 Å and the second dielectric layer 685 has a thickness of 300-800 Å. The recording layer 684 is made of TbFeCo, NdTbFeCo, TbFe, etc., in order to perform a magneto optical recording, and has a thickness of 150-400 Å. The protective layer 683 can be made of either an optically transparent inorganic material or an organic material. In this embodiment, the protective layer 683 is made by spin-coating acrylate resin, and has a thickness of 5-100 µm. The surface of the protective layer 683 is texturing-processed in order to reduce a stiction called a static friction. The interval of a bump by the texturing process is 20-60 µm and a texturing depth (or bump height) is 5-50 Å. The lubricant film 687 formed on the protective layer 686 has a thickness of 1-3 nm and is a lubricant which does not react chemically with the protective layer 683 and is made of PFPE (PerfluoroPolyether). Fomblin Z Dol or Fomblin 2001 which is used in a hard disc is used as a lubricant. Galden SV is used as a solvent mixed with the lubricant.

Figure 12:
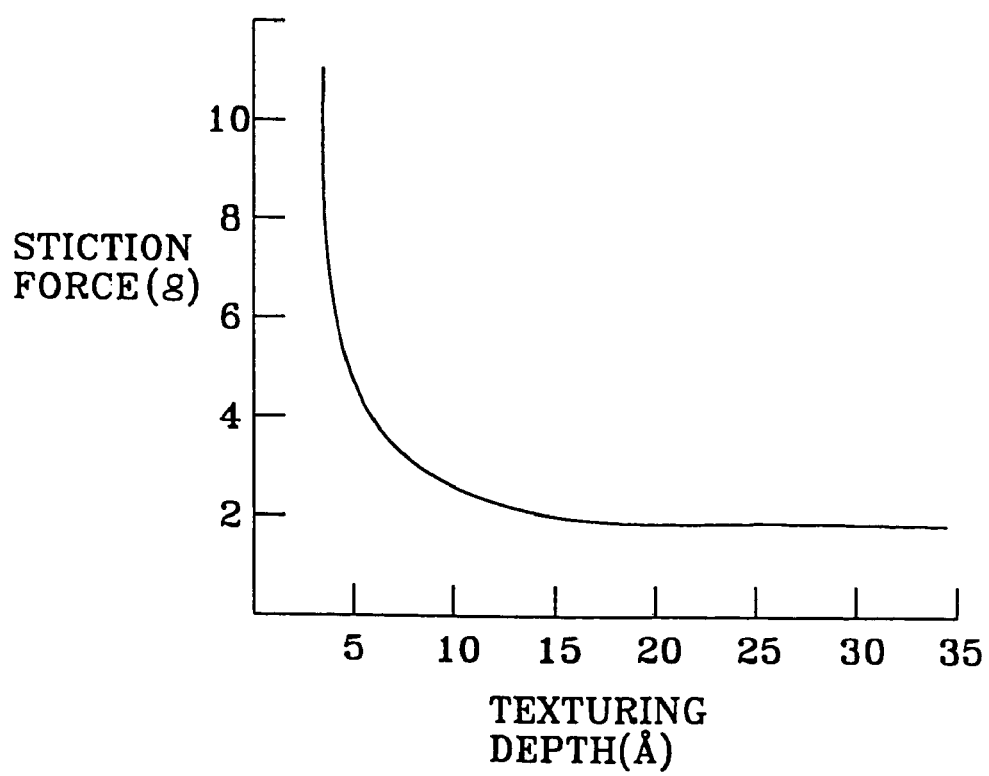
FIG. 12 is a graphical view showing the change of the relative movement stiction force with the texturing depth in the optical disc shown in FIG. 11.

Referring to FIG. 12, in the case that texturing is not processed on the surface of the optical disc, a stiction occurs. However, in the case that texturing having a depth of 5 Å or more is performed, the stiction is reduced.

In the present invention, the solid immersion optical system or solid immersion lens has been used. However, it is apparent to those having an ordinary skill in the art that a general focusing optical system may be used instead of the solid immersion optical system or solid immersion lens, if the air gap between the emergence surface of the optical system and the protective layer of the optical storage medium is smaller than one wavelength of the used light and the thickness of the protective layer is thicker than the wavelength of the used light.

In the above-described embodiments, the reflective mirror 12 or 22 plays a role of transferring the light beam emitted from the light transmission and reception portion to the solid immersion lens and transferring the light beam incident from the solid immersion lens to the light transmission and reception portion. Thus, various optical elements which can change an optical path, such as a prism, can be used instead of the reflective mirror.

As described above, the optical data storage system according to the present invention uses an optical storage medium in which a thickness of an optical transmissive layer thereof put between the emitting surface of a focusing optical system such as a solid immersion optical system or solid immersion lens and a recording layer is larger than the wavelength of light used. Thus, in the present invention, the light beam reflected from the inside of the air gap or the inside of the optical storage medium between the air gap and the recording layer does not function as noise with respect to the light beam reflected from the recording layer. Also, in the present invention, since the thickness of the protective layer or the substrate which becomes the external surface of the optical storage medium is increased, information can be written or read accurately with respect to the optical storage medium having dust or damage.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical data storage system for writing and/or reading information with respect to an optical storage medium, the optical data storage system comprising:
 an optical pickup including a focusing lens to emit a light beam onto the optical storage medium so as to write and/or read information on/from the optical storage medium; and
 the optical storage medium including:
  an optical transmissive layer exhibiting a thickness larger than one wavelength of the light beam, and having first and second surfaces opposing each other, in which the first surface opposes the focusing lens, and
  a recording layer positioned in the second surface of the optical transmissive layer;
 wherein an interval between the first surface and a surface of the focusing lens opposing the first surface is smaller than one wavelength of the light beam.

2. The optical data storage system according to claim 1, wherein, when the focusing lens is slanted with respect to the optical storage medium, an interval between a portion of the focusing lens farthest from the first surface of the optical storage medium and the first surface of the optical storage medium is maintained within one wavelength of the light beam.

3. The optical data storage system according to claim 1, wherein the optical transmissive layer has a thickness of approximately several micrometers to several hundred micrometers.

4. The optical data storage system according to claim 3, wherein the optical transmissive layer is a substrate having an unevenness structure formed on the second surface thereof, and wherein the unevenness structure forms a pre-formatted structure for storing the information.

5. The optical data storage system according to claim 4, wherein the unevenness structure comprises a plurality of grooves or pits which are engraved toward the second surface of the optical transmissive layer.

6. The optical data storage system according to claim 5, wherein the plurality of grooves or pits each of which has a width of approximately 100-150 nm and the recording layer has a thickness of approximately 150-400 nm.

7. The optical data storage system according to claim 1, wherein an interval between the first surface of the optical transmissive layer and the focusing lens is less than ¼ of the wavelength of the light beam.

8. The optical data storage system according to claim 1, wherein the optical pickup comprises a focusing optical system having a numerical aperture of at least one.

9. The optical data storage system according to claim 8, wherein the focusing optical system is a catadioptric solid immersion optical system.

10. The optical data storage system according to claim 8, wherein the focusing optical system is a refractive type solid immersion lens.

11. The optical data storage system according to claim 8, further comprising:
a light transmission and reception portion to emit the light beam and to detect the light beam reflected from the optical storage medium;
a slider arranged to float the focusing optical system from the first surface of the optical storage medium aerodynamically; and
optical path changing means for transferring the light beam emitted from the light transmission and reception portion to the focusing optical system, and transferring the light beam reflected from the optical storage medium passing through the focusing optical system to the light transmission and reception portion.

12. The optical data storage medium according to claim 1, further comprising:
a substrate;
a reflective layer formed on the substrate;
a first dielectric layer formed on the reflective layer;
the recording layer formed on the first dielectric layer;
a second dielectric layer formed on the recording layer;
a protective layer formed on the second dielectric layer; and
a lubricant film formed on the protective layer.

13. The optical data storage medium according to claim 12, wherein:
the substrate is made of glass, polycarbonate, PMMA, or an acrylate resin, has an unevenness structure of a track pitch of 0.3-0.4 μm and a groove depth of 50-800 Å;
the reflective layer is one of aluminum, nickel, copper, platinum, silver and gold, and has a thickness of 100-400 Å;
the first and second dielectric layers are made of Si3N4 or ZnS-SiO2, the first dielectric layer has a thickness of 100-400 Å and the second dielectric layer has a thickness of 300-800Å;
the recording layer is made of one of TbFeCo, NdTbFeCo and TbFe, and has a thickness of 150-400 Å;
the protective layer is one of optically organic transparent inorganic and inorganic material, and has a thickness of 5-100 μm; and
the lubricant film has a thickness of 1-3 nm and does not chemically react with the protective layer.

14. The optical data storage system medium according to claim 1, wherein the optical transmissive layer is a protective layer.

15. The optical data storage system according to claim 14, wherein the recording layer is formed of a plurality of grooves or pits, each of which has a width less than a thickness of the protective layer from the first surface to the grooves or pits.

16. The optical data storage system according to claim 1, further comprising a substrate formed at the second surface of the optical transmissive layer.

* * * * *